(12) United States Patent
Fitzgibbon

(10) Patent No.: US 8,294,553 B2
(45) Date of Patent: Oct. 23, 2012

(54) METHOD AND SYSTEM FOR OPERATION OF A MOVABLE BARRIER OPERATOR AND AN AUDIO AMPLIFIER

(75) Inventor: James Joseph Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 868 days.

(21) Appl. No.: 12/420,279

(22) Filed: Apr. 8, 2009

(65) Prior Publication Data

US 2010/0259411 A1    Oct. 14, 2010

(51) Int. Cl.
 *B60R 25/00* (2006.01)
(52) U.S. Cl. ......................................................... 340/7.1

(58) Field of Classification Search .................. 340/5.71, 340/3.1, 5.61, 561; 307/38; 704/273, 274
See application file for complete search history.

(56) References Cited

U.S. PATENT DOCUMENTS 6,014,077 A * 1/2000 Beaumont et al. ......... 340/545.1
2004/0227410 A1  11/2004 Fitzgibbon

* cited by examiner

*Primary Examiner* — Vernal Brown
(74) *Attorney, Agent, or Firm* — Fitch Even Tabin & Flannery LLP

(57) ABSTRACT

A movable barrier operator system includes a motor that is used to move a movable barrier. The system also includes an audio amplifier device. First power is supplied to the audio amplifier device to thereby render corresponding content locally audible. Information regarding starting of the motor is received and the first power supplied to the audio amplifier device is automatically reduced in response to receiving the information.

36 Claims, 5 Drawing Sheets

METHOD AND SYSTEM FOR OPERATION OF A MOVABLE BARRIER OPERATOR AND AN AUDIO AMPLIFIER

TECHNICAL FIELD

This invention relates generally to movable barrier operators, and more specifically to powering various components associated with these systems.

BACKGROUND

Various types of movable barrier operators have been used to move different types of barriers throughout the years. For example, garage door operators have been used to move garage doors and gate operators have been used to move gates.

Whatever their type, movable barrier operators typically control access to a secured area, for instance, a garage. In the case of the secured space being a garage, a vehicle may be parked in the garage. However, other activities are frequently conducted by the owner of the garage (or others that are permitted access to the garage) in addition to parking a vehicle.

For instance, a workshop or similar arrangement may be situated in the garage and an individual may spend substantial amounts of time in this workshop. The user may also be present in the garage for other reasons and/or for shorter time periods (e.g., to clean the garage, take out garbage, or service a vehicle to name a few examples). While engaging in these activities in the garage, the user may desire to listen to music or watch television.

The garage may be located remotely from the front door of a residence and the user may be unable to hear the doorbell or chimes associated with the front door of the residence when these devices have been actuated. In all of the above-mentioned situations, audio amplifier devices may be used to render desired audio information to the user in the garage or other secured area.

The operation of the audio amplifier device requires obtaining power from a power supply. By some previous approaches, the user typically connected the movable barrier operator and the audio amplifier to the same transformer-based power supply. Unfortunately, due to the concurrent requirement of at least occasional high power levels for both the audio amplifier and the movable barrier operator, problems have occurred in these previous systems when simultaneous operation of these devices was attempted.

For example, in some previous systems when the movable barrier operator was running, a loud passage was simultaneously rendered by the audio amplifier. The rendering of the loud passage drew a substantial amount of power from the power supply, at least temporarily reducing power delivered to the operator, and thereby causing a force-based reversal of the operator (or otherwise negatively impacting operator performance). Previous systems attempted to overcome this problem by increasing the size of the transformer and thereby providing enough power for the simultaneous operation of both the movable barrier operator and the audio amplifier. However, increasing the size of the transformer also increased the cost of the system. In addition, the resultant increased size and weight of the power supply led to problems in fitting the power supplies into areas where space was at a premium or where weight was a concern.

SUMMARY

Approaches are described herein wherein an audio amplifier and a movable barrier operator are operated so as to draw appropriate levels of power, current, and/or voltage from a power supply without negatively impacting the performance of either device. More specifically, these approaches allow both the audio amplifier and the movable barrier to be operated without the need to increase the size of any power transformer of a power supply that provides power to these devices.

In many of these embodiments, a movable barrier operator system includes a motor that is used to move a movable barrier. The system also includes an audio amplifier device. First power is supplied to the audio amplifier device to thereby render corresponding content locally audible. Information regarding starting of the motor is received and the first power supplied to the audio amplifier device is automatically reduced in response to receiving the information.

The information regarding the starting of the motor can include many types of information or data such as information indicating the actual start of the motor or information relating to the impending start of the motor. Other types of information or data may also be provided.

In others of these embodiments, second power is subsequently supplied to the motor and the movable barrier is moved using the motor while having reduced the first power being supplied to the audio amplifier device. The first power is then automatically re-applied to the audio amplifier device after the motor halts operation.

The first power may be adjusted in a variety of different ways. For example, the first power being provided to the audio amplifier device may be substantially eliminated (e.g., reduced to zero or near zero). In another example, the first power supplied to the audio amplifier device may be reduced to a non-zero amount.

The audio amplifier device may be coupled to or include various other devices. In one example, the audio amplifier device is coupled to an audio speaker. The audio amplifier device may be coupled to other devices as well.

The content of the information that is audibly rendered may be any type of information presented in any type of format. For example, the content may be musical content, human voice content, a doorbell chime, a sound annunciation (or sound effect), a radio broadcast, or a television broadcast. Other examples of content may also be rendered to the user.

The movable barrier may be selected from a number of different types of barriers. For example, the movable barrier may be a garage door, a sliding door, a swinging door, a swinging gate, a sliding gate, or shutters. Other types of barriers are possible.

Thus, approaches are described herein wherein an audio amplifier and a movable barrier are controlled so as to draw appropriate levels of power, current, and voltage from a power supply without negatively impacting the performance of either the movable barrier operator or the audio amplifier. More specifically, these approaches provide for the operation of the audio amplifier and the movable barrier operator without the need to increase the size or weight of the power transformer in the power supply that provides power to both of these devices.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Figure 1:
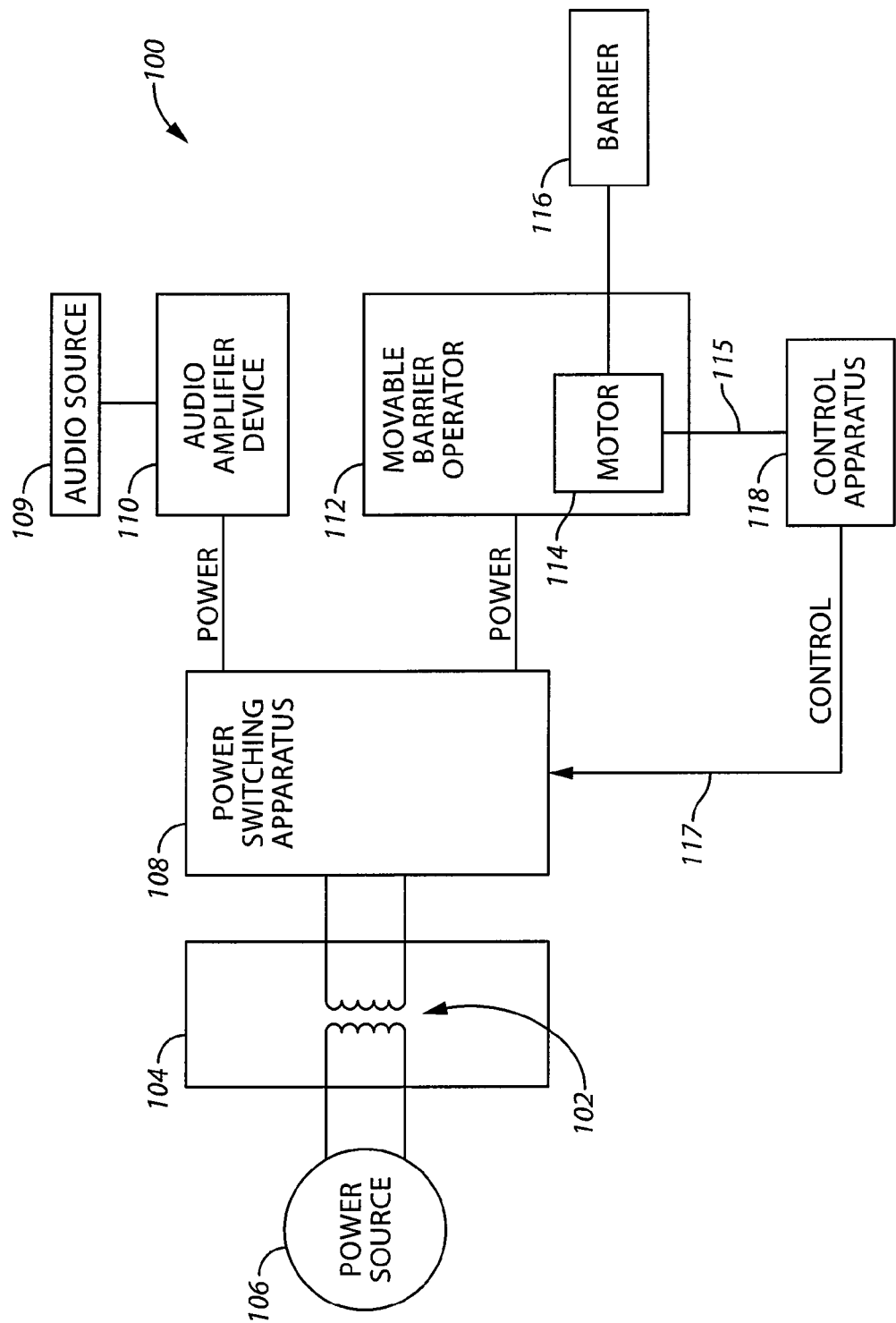
FIG. 1 comprises a block diagram of a system that operates a movable barrier operator and an audio amplifier according to various embodiments of the invention.

Referring now to FIG. 1, one example of a movable barrier operator system 100 that adjusts power for a movable barrier operator 112 and an audio amplifier 110 is described. The system includes a transformer 102 that is included within a power supply 104. The transformer 102 is configured to receive power from a power source 106. In one example, the power source 106 may be an alternating current (AC) mains line voltage. (The expression "mains" will be understood to refer to a supply of general purpose alternating current (AC) electrical power. Other common expressions for the same power supply as household power, household electricity, domestic power, wall power, line power, AC power, city power, and grid power. Other types of power sources may also be used. The transformer 102 and associated circuitry (e.g., a rectifier) converts the AC mains line voltage to a direct current (DC) voltage and may alter the magnitude of the voltage. The power supply 104 may provide other functions (e.g., noise removal) and process the voltage, current, and/or power in other ways as well.

A power switching apparatus 108 is coupled to the transformer 102 of the power supply 104. The power switching apparatus 108 is a controllable switching device that is used to control or regulate the amount of power output to the movable barrier operator 112 and the audio amplifier 110 based upon received inputs.

The power switching apparatus 108 may be configured in a variety of different ways and may include a variety of different components to perform its functions. In this regard, the power switching apparatus 108 may include transistors or other controllable switching components that act to switch power received from the power supply 104 to one or both of the audio amplifier 110 and the movable barrier operator 112. The received inputs cause the power switching apparatus 108 to switch power to one or both of the audio amplifier device 110 and the movable barrier operator 112.

More specifically, the power switching apparatus 108 may supply varying levels of power to the audio amplifier device 110 and the movable barrier operator 112 depending upon the control signals received from the control apparatus 118. In some situations (depending upon the inputs received) the power switching apparatus 108 may supply full power to the movable barrier operator 112 and no power to the audio amplifier device 110. In other circumstances, the power switching apparatus 108 may supply full power to the audio amplifier device 110 and no power to the movable barrier operator 112. In other examples, the power switching apparatus 108 may supply some non-zero amount of power to both the audio amplifier device 110 and the movable barrier operator 112.

The audio amplifier device 110 is coupled to the power switching apparatus 108 and is configured to receive power from the transformer 102 via the power switching apparatus 108. The audio amplifier device 110 is further configured to render audio signals having a corresponding content to a user. In this respect, the audio amplifier device 110 may receive audio signals from an audio source 109. The audio source 109 may be a doorbell, a radio, or a television to name a few examples. The content of the signals rendered by the audio amplifier, to name a few examples, may include musical content, human voice content, a sound annunciation or sound effect (e.g., alarms sounds, clicking sounds, or beep/bleeping sounds used in electronic devices as annunciations or sound effects), a doorbell chime, a radio broadcast, or a television broadcast.

The audio amplifier device 110 may include or be coupled to components (such as a speaker) to further process or render the signals it receives. The audio amplifier device 110 may perform other processing functions (e.g., noise removal from the signals) as well.

The movable barrier operator 112 includes a motor 114 that is coupled to the power switching apparatus 108. The motor 114 is coupled to and configured to move a movable barrier 116. The motor 114 is any type of motive device that is capable of moving any type of barrier.

A control apparatus 118 is coupled to the motor 114 and the power switching apparatus 108. The control apparatus 118 may be separate from the movable barrier operator 112 or part of (i.e., integrated with) the movable barrier operator 112 (e.g., positioned within a housing of the movable barrier operator 112). The control apparatus 118 is configured to receive an indication via an indication line 115 pertaining to the start of the motor 114. The control apparatus 118 is further configured to, upon receiving the indication, form and responsively transmit a first signal to the power switching apparatus 108 via a control line 117. The first signal is operable to cause the power switching apparatus 108 to reduce (to a zero or non-zero amount) the power being supplied to the audio amplifier device 110.

The control apparatus 118 may be any type of programmed control unit that receives input signals and issues control commands in response to these input signals. For example, the control apparatus 118 may include a microprocessor or some other type of programmed control device. One example of a control apparatus is described elsewhere in this specification.

The information pertaining to the start of the motor 114 may relate to the actual start of the motor 114 or the impending start of the motor 114. To take a few examples, the impending start of the motor 114 may relate to a scheduled start time of the motor 114 or may be at a time after the occurrence of a predetermined event (e.g., 10 seconds after a sensor detects that a user has entered the garage from their house). Other types of information may be communicated from the motor as well.

In other examples of the operation of the system of FIG. 1, the control apparatus 118 receives a second signal from the motor 114 via the indication line 115. The second signal indicates the halting (or impending halting) of the operation of the motor 114. The control apparatus 118 is further configured to responsively form and send a third signal to the power switching apparatus 108 via the control line 117 and the third signal operates to cause the power switching apparatus 108 to re-apply the power received from the transformer 102 to the audio amplifier device 110. Alternatively, the third signal may cause power to be increased whenever power has not been completely disconnected from the audio amplifier device 110. This re-application of power can comprise a single-step function to essentially immediately raise the power to a normal level, or can be raised more gradually if desired.

In some approaches, the indication line 115 may include physically and/or logically separate lines. For example, one of these lines may carry the second signal and other lines may carry other types of information. Similarly, the control line 117 may include physically and/or logically separate lines. In this case, one of these separate lines may carry the first signal and another may carry the third signal. In still another example, the indication line 115 and control line 117 may be a wireless or optical links (e.g., radio frequency (RF) connections).

In another example of the operation of the system of FIG. 1, the first signal is operable to reduce the power supplied to the audio amplifier device to a substantially zero amount (e.g., exactly zero or a small, non-zero amount such as an amount within a predetermined electrical noise margin or very small residual or leakage power). In another example, the first signal is operable to reduce the power supplied to the audio amplifier device 110 to a substantial non-zero amount (e.g., above a noise or background/leakage power amount).

The movable barrier 116 may be selected from a number of different types of barriers. For example, the movable barrier 116 may be a garage door, a sliding door, a swinging door, a swinging gate, a sliding gate, or shutters. Other types of barriers are possible.

Figure 2:
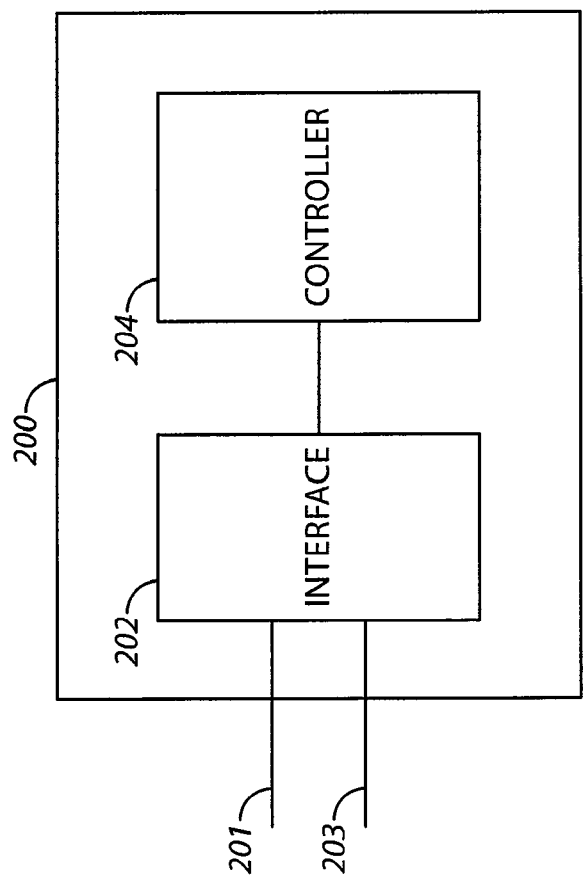
FIG. 2 comprises a block diagram of one example of a control apparatus according to various embodiments of the invention.

Referring now to FIG. 2, one example of a control apparatus 200 for operating a moveable barrier using a motor (not shown in FIG. 2) and an audio amplifier device (not shown in FIG. 2) in a movable barrier operator system includes an interface 202 and a controller 204. The interface 202 includes an input 201 that receives indication signals and an output 203 that transmits control signals. The indication signals received at the input 201 indicate whether the motor has started or whether the start of the motor is impending. The control signals transmitted from the output 203 control the audio amplifier device. For example, the control signals transmitted at the output 203 cause the amount of power supplied to the audio amplifier to be decreased or the control signals may deactivate the audio amplifier device. In other cases, the control signals at the output 203 may also cause the audio amplifier device to be reactivated or may act to increase the power supplied to the audio amplifier device. The control signals may be sent to a power switching apparatus (e.g., the power switching apparatus 108). Alternatively, the control signals may be sent directly to the audio amplifier device.

The indication and control signals may be of any form or format. For instance, they may be digital signals that are encoded with various types of information (e.g., indicating an amount of power to be supplied to the audio amplifier) or they may be analog signals that directly activate or deactivate the audio amplifier device. Other examples of indication and control signals are possible.

The controller 204 is coupled to the interface 202. The controller 204 is configured to receive (via the input 201 of the interface 202) indication signals that pertain to the start of the motor. The controller 204 is further configured to, upon receiving the indication, form and responsively transmit a first control signal at the output 203 of the interface 202. The first control signal is operable to reduce the power supplied to the audio amplifier device. In this respect and as mentioned, the first control signal may be transmitted directly to the audio amplifier or to some other device (e.g., the power switching apparatus 108 of FIG. 1) that itself controls the power supplied to the audio amplifier device.

As indicated above, the information pertaining to the start of the motor may relate to an actual start of the motor. Alternatively, the information may relate to an impending start of the motor. Also as mentioned, other information such as the desired power level of the audio amplifier device may be included with the control signals.

In another example of the operation of the device 200, the controller 204 receives a second indication signal via the input 201 of the interface 202. The second indication signal indicates the halting of the operation of the motor. The controller 204 is further configured to responsively form and transmit a control signal at the output 203 of the interface 202. The control signal is operable to cause a re-application of the power to the audio amplifier device.

Figure 3:
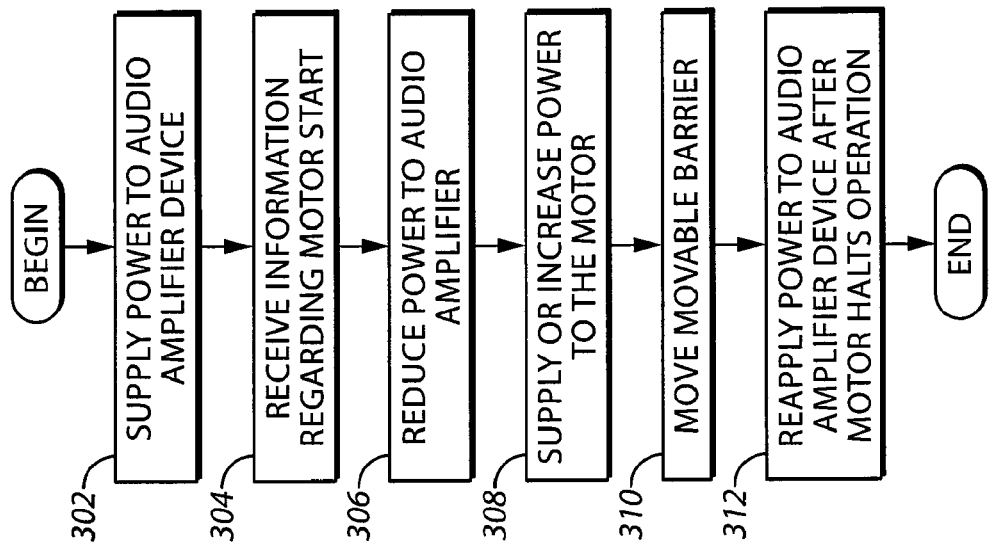
FIG. 3 comprises a flow chart of one approach for operating a movable barrier operator and an audio amplifier according to various embodiments of the invention.

Referring now to FIG. 3, one example of an approach for supplying power to a movable barrier operator and an audio amplifier device associated with the movable barrier operator is described. At step 302, power is supplied to the audio amplifier device to render corresponding content locally audible to a user. For example, the content that is rendered may include musical content, human voice content, sound annunciations or sound effects (e.g., alarms sounds, clicking sounds, or beep/bleeping sounds used in electronic devices as annunciations or sound effects), doorbell chimes, radio broadcasts, or television broadcasts. Other examples of content may also be rendered to the user.

At step 304, information regarding the start of the motor is received. The information pertaining to the start of the motor may relate to the actual start of the motor or the impending start of the motor. Other types of information may be communicated from the motor as well.

At step 306, the power supplied to the audio amplifier device is automatically reduced in response to receiving the information regarding the start of the motor. The power may be reduced to a zero or non-zero amount.

At step 308, power is subsequently supplied to the motor. Alternatively, if power is already being supplied to the motor, then the power being supplied to the motor may be increased.

At step 310, the motor moves the movable barrier while a reduced power amount (or zero power) is temporarily supplied to the audio amplifier device. Consequently, any power drawn by the audio amplifier device will not adversely affect the operation of the motor (and hence, the operation of the movable barrier operator system).

At step 312, the power is then automatically re-applied to the audio amplifier device after the motor halts operation or after the impending halt of the motor is detected or determined. The halting of the operation of the motor may be communicated from the motor. Alternatively, power may be re-supplied to the motor upon the occurrence of some other event (e.g., the motor may be running and operating in a particular mode of operation or may change modes of operation). In yet another example, power may be reapplied to the audio amplifier device upon expiration of a predetermined time period (measured from the start/impending start of the motor or some other event).

Figure 4:
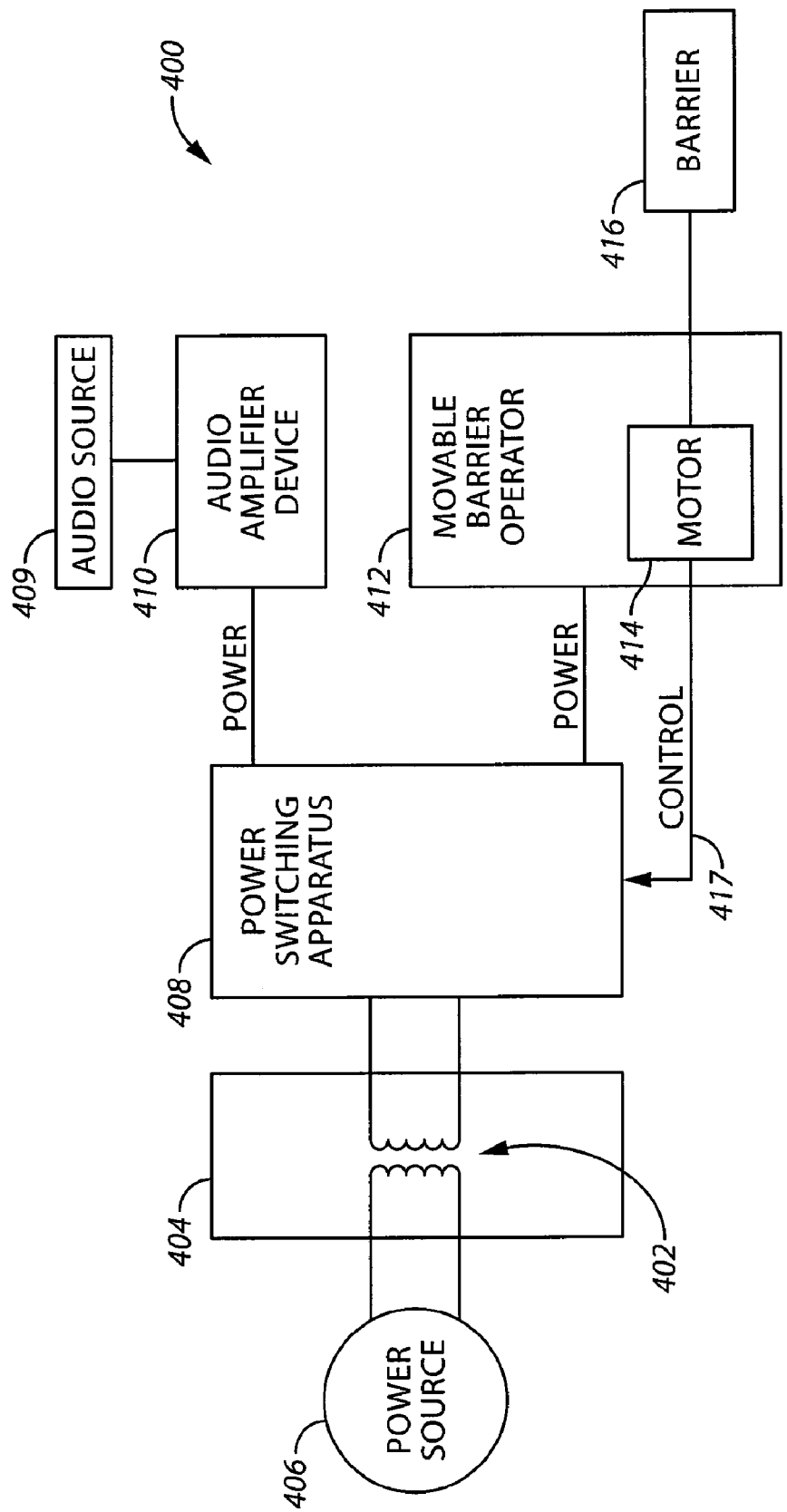
FIG. 4 comprises another example of a system that operates a movable barrier operator and an audio amplifier according to various embodiments of the invention.

Referring now to FIG. 4, another example of a movable barrier operator system 400 that adjusts power for a movable barrier operator 412 and an audio amplifier 410 is described. The system 400 includes a transformer 402 that is included in a power supply 404. The transformer 402 is configured to receive power from a power source 406. In one example, the power source 406 may be an alternating current (AC) mains line voltage. Other examples of power sources are possible.

A power switching apparatus 408 is coupled to the transformer 402 of the power supply 404. The power switching apparatus 408 is a controllable switching device that is used to control the amount of power output to the movable barrier operator 412 and the audio amplifier 410 based upon received inputs.

The power switching apparatus 408 may be configured in a variety of different ways and may include a variety of different components to perform its functions. In this regard, the power switching apparatus 408 may include transistors or other controllable switching arrangements to switch power received from the power supply 404 to one or both of the audio amplifier 410 and/or the movable barrier operator 412.

The power switching apparatus 408 may supply varying levels of power to the audio amplifier device 410 and the movable barrier operator 412 depending upon the control signals received from a motor 414. In one example, the power switching apparatus 408 may supply full power to the movable barrier operator 412 and no power to the audio amplifier device 410. In another example, the power switching apparatus 408 may supply full power to the audio amplifier device 410 and no power to the movable barrier operator 412. In still another example, the power switching apparatus 408 may supply a non-zero amount of power to both the audio amplifier device 410 and the movable barrier operator 412. Thus, in contrast to the example, of FIG. 1, the motor 414 directly supplies a control signal 417 directly to the power switching apparatus 418 without the interaction of another physically separate device. The absence of a separate control apparatus (e.g., the control apparatus 118 of FIG. 1) may make the approaches described in FIG. 4 particularly useful when retrofitting existing systems where cost is a concern since a separate control element (e.g., the control apparatus 118) is not needed.

The audio amplifier device 410 is coupled to the power switching apparatus 408 and is configured to receive power from the transformer 402 via the power switching apparatus 408. The audio amplifier device 410 is further configured to amplify and otherwise render audio signals having a corresponding content to a user. In this respect, the audio amplifier device 410 may receive audio signals from an audio source 409. To name a few examples, the audio source 409 may be a doorbell, a radio, or a television or other video rendering platform. The content of the signals rendered by the audio amplifier, to name a few examples, may include musical content, human voice content, sound annunciations or effects (e.g., alarms sounds, clicking sounds, or beep/bleeping sounds used in electronic devices as annunciations or sound effects), doorbell chimes, radio broadcasts, or television broadcasts. Other examples of audio sources and audio content are possible.

The audio amplifier device 410 may include or be coupled to other components (such as a speaker) to further render or process the signals it receives to a user. Additionally, the audio amplifier device 410 may perform other processing functions (e.g., noise removal).

The motor 414 is coupled to the power switching apparatus 408. The motor 414 is also coupled to and configured to move a movable barrier 416. The motor 414 is any type of device that is capable of moving any type of barrier.

The motor 414 is further configured to form and responsively transmit a first signal to the power switching apparatus 408 via a control line 417. The first signal is operable to cause the power switching apparatus 408 to reduce the power being supplied to the audio amplifier device 410.

The information pertaining to the start of the motor 414 may relate to the actual start of the motor 414 or the impending start of the motor 414. Other types of information may be communicated from the motor 414 as well.

In other examples of the operation of the system of FIG. 4, the power switching apparatus 408 receives a second signal from the motor 414 via the control line 417. The second signal indicates the halting of the operation of the motor 414. Reception of the second signal at the power switching apparatus 408 causes the power switching apparatus 408 to re-apply the power received from the transformer 402 to the audio amplifier device 410. Alternatively, if power were still being supplied to the audio amplifier device, the power may be increased.

The control line 417 may include physically or logically separate lines that each conduct a different control signal. For example, one of these separate lines may carry the first signal and another may carry the second signal. In still another example, the control line 417 may be a wireless or optical link (e.g., radio frequency (RF) connection).

In one example of the operation of the system of FIG. 4, the first signal is operable to reduce the power supplied to the audio amplifier device 410 to a substantially zero amount (e.g., exactly zero or within a predetermined noise margin or background/leakage power amount). In another example, the first signal is operable to reduce the power supplied to the audio amplifier device 410 to a substantial non-zero amount (e.g., above a noise or background/leakage power amount).

Figure 5:
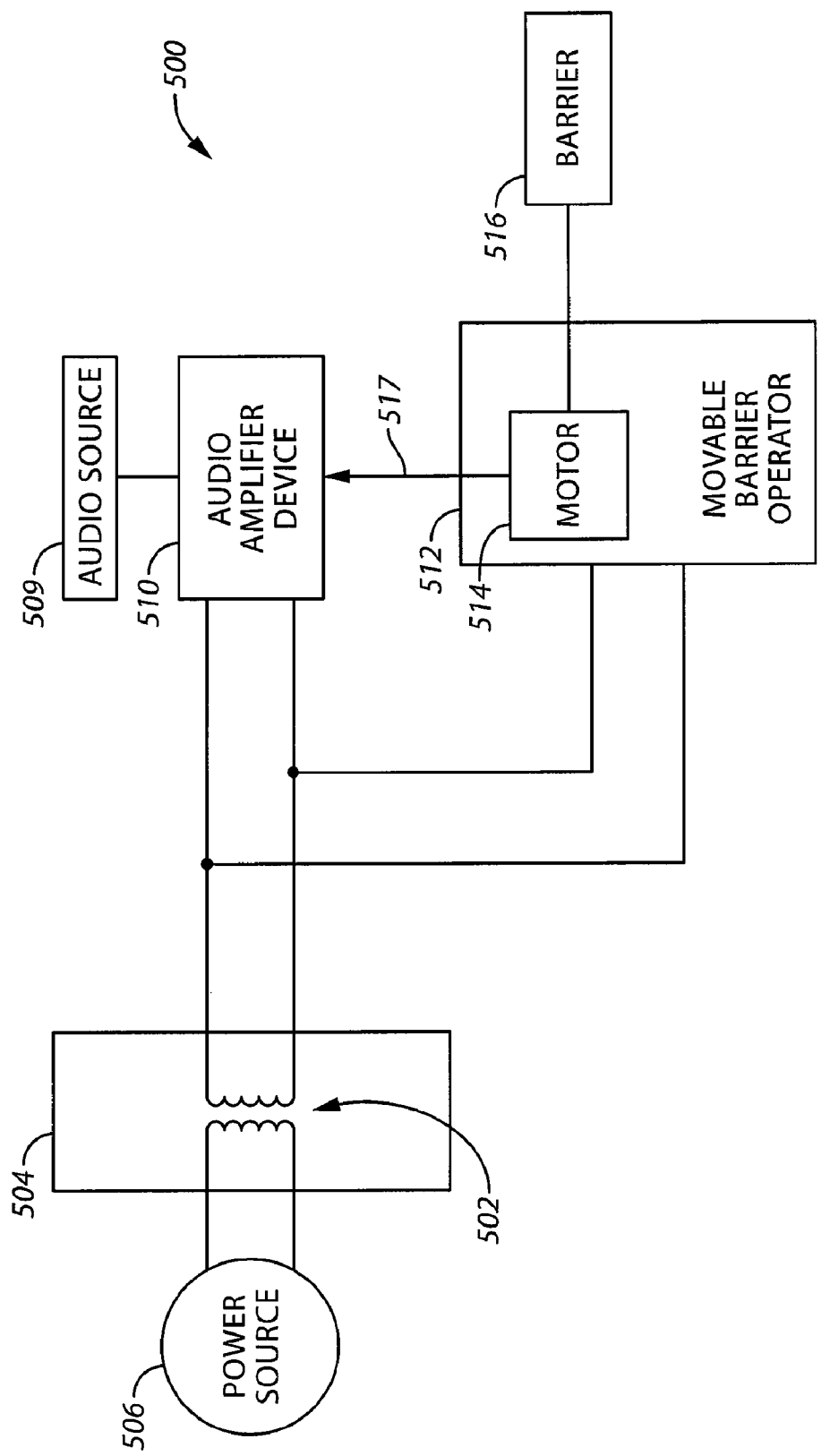
FIG. 5 comprises yet another example of a system that operates a movable barrier operator and an audio amplifier according to various embodiments of the invention.

Referring now to FIG. 5, another example of a movable barrier operator system 500 that adjusts power for a movable barrier operator 512 and an audio amplifier 510 is described. The system includes a transformer 502 that is included within a power supply 504. The transformer 502 is configured to receive power from a power source 506. The power source 506 may be an alternating current (AC) mains line voltage in one example. As compared to the examples of FIG. 1 and FIG. 4, the power switching apparatus and the separate control apparatus are omitted from the example of FIG. 5. The absence of these devices as separate physically units may make the approaches described in FIG. 5 particularly appropriate for the retrofitting of existing systems where cost is a concern since these devices are not required to be installed.

An audio amplifier device 510 is coupled to the transformer 502 of the power supply 504. As mentioned, the motor 514 of a movable barrier operator 512 supplies a control signal 517 directly to the audio amplifier device 510.

The audio amplifier device 510 is further configured to amplify or otherwise render audio signals having a corresponding content locally to a user. In this respect, the audio amplifier device 510 may receive audio signals from an audio source 509. As with the other examples described herein, the audio source 509 may be a doorbell, a radio, or a television. Also as described elsewhere herein, the content of the signals rendered by the audio amplifier, to name a few examples, may include musical content, human voice content, sound annunciations or effects (e.g., alarms sounds, clicking sounds, or beep/bleeping sounds used in electronic devices as annunciations or sound effects), doorbell chimes, radio broadcasts, and television broadcasts. Other examples of audio sources and audio content are possible.

The audio amplifier device 510 may include other components (such as a speaker) to further render or process the signals it receives. The audio amplifier device 510 may perform other processing functions (e.g., noise removal) as well.

The motor 514 is coupled to the transformer 502 of the power supply 504. The motor 514 is also coupled to and configured to move a movable barrier 516. The motor 514 is any type of device that is capable of moving any type of barrier.

The motor 514 is further configured to form and responsively transmit a first signal to the audio amplifier 510 via a control line 517. The first signal is operable to cause the audio amplifier device 510 to deactivate or to reduce the amount of power drawn from the power supply 504.

The information pertaining to the start of the motor 514 may relate to the actual start of the motor 514 or the impending start of the motor 514. Other types of information may be communicated from the motor as well.

In other examples of the operation of the system of FIG. 5, the audio amplifier 510 receives a second signal from the motor 514 via the control line 517. The second signal indicates the halting of the operation of the motor 514. Reception of the second signal at the audio amplifier 510 reactivates the audio amplifier 510 or causes the audio amplifier to increase the power it draws from the power supply 504.

The control line 517 may include physically or logically separate lines. For example, one of these separate lines may carry the first signal and another may carry the second signal. In still another example, the control line 517 may be a wireless or optical link (e.g., radio frequency (RF) connection).

In one example, the first signal is operable to reduce the power drawn by the audio amplifier device 510 to a substantially zero amount (exactly zero or within a predetermined margin of noise or background power). In another example, the first signal is operable to reduce the power drawn by the audio amplifier device 510 to a substantial non-zero amount (e.g., above a noise or background/leakage power amount).

Figure 6:
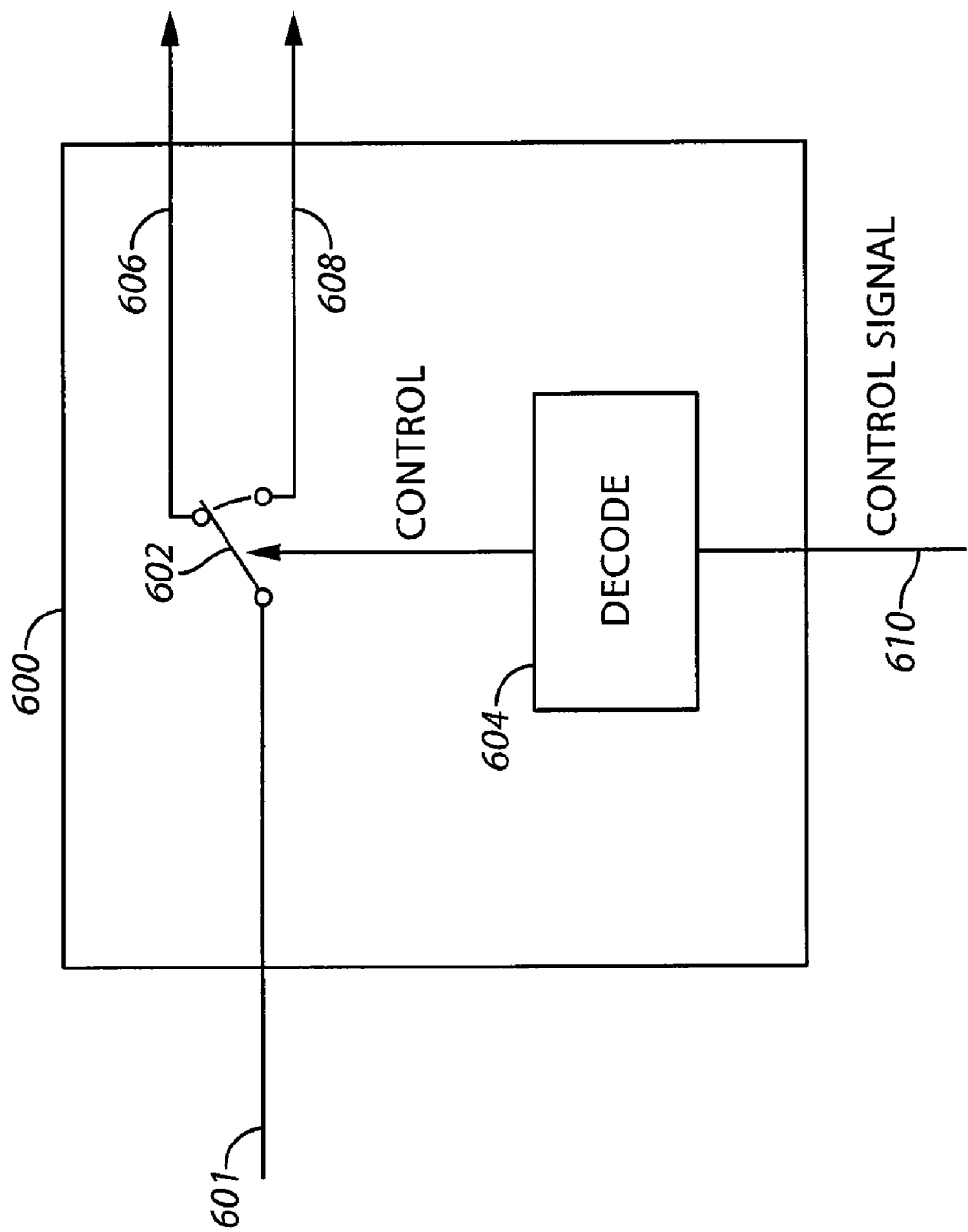
FIG. 6 comprises a diagram of a power switching apparatus according to various embodiments of the present invention.

Referring now to FIG. 6, one example of a power switching apparatus (e.g., the power switching apparatus 108 of FIG. 1) is described. A power switching apparatus 600 includes a power input 601 (from a power supply) and a switch 602 that switches power between a first output 606 (to an audio amplifier device) and a second output 608 (to a movable barrier operator).

The position of the switch 602 is controlled by a decoder 604. The decoder 604 is itself controlled by a control signal 610. The control signal 610 indicates the start of the motor, the impending start of the motor, or the deactivation of the motor to name a few examples. The decoder 604 receives the signal, decodes the signal, then moves the switch 602 to the position indicated by the decoded signal.

The power switching apparatus 600 is described in this example as switching power between one of two outputs. Consequently, only one of these outputs (e.g., the first output 606 leading to the audio amplifier device or the second output 608 leading to the movable barrier operator) will conduct power at any given time. However, it will be understood that the power switching apparatus 600 is only one example and that other power switching arrangements may also be used that switch varying non-zero amounts of power between two outputs. In other words, both of the outputs 606 and 608 may be supplied with substantial non-zero amounts of power depending upon the control signal 610.

Thus, approaches are described herein wherein both an audio amplifier and movable barrier operator can be operated in a movable barrier operator system without negatively impacting system performance. More specifically, these approaches allow the audio amplifier and the movable barrier to operate without the need to increase the size of the power transformer in the power supply that supplies power to both devices to support the occasional higher power requirements of the movable barrier operator motor. Consequently, low system costs may be maintained while maintaining desired system performance.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for use with a movable barrier operator system having a motor to move a movable barrier and having an audio amplifier device, the method comprising:
supplying first power to the audio amplifier device to thereby render corresponding content locally audible;
receiving information regarding starting of the motor;
automatically reducing the first power supplied to the audio amplifier device in response to receiving the information.

2. The method of claim 1 wherein the information regarding starting of the motor is selected from the group consisting of information relating to the actual start of the motor and information relating to the impending start of the motor.

3. The method of claim 1 further comprising subsequently supplying second power to the motor and moving the movable barrier using the motor while having reduced the first power being supplied to the audio amplifier device.

4. The method of claim 3 wherein the first power and the second power are produced from a common power supply.

5. The method of claim 3 further comprising automatically re-applying the full first power to the audio amplifier device after the motor halts operation.

6. The method of claim 5 wherein automatically re-applying the full first power to the amplifier device occurs after a predetermined time period.

7. The method of claim 1 wherein reducing the first power comprises substantially eliminating the first power being provided to the audio amplifier device.

8. The method of claim 1 wherein reducing the first power comprises reducing the first power supplied to the audio amplifier device to a non-zero amount.

9. The method of claim 1 wherein the audio amplifier device is coupled to an audio speaker.

10. The method of claim 1 wherein the content is selected from the group consisting of musical content, human voice content, a sound annunciation, a doorbell chime, a radio broadcast, and a television broadcast.

11. The method of claim 1 wherein the movable barrier is selected from the group consisting of a garage door, a sliding door, a swinging door, a swinging gate, a sliding gate, and shutters.

12. A control apparatus for operating a moveable barrier and an audio amplifier device in a movable barrier operator system comprising:
an interface including an input and an output;
a controller coupled to the interface, the controller configured to receive via the input of the interface an indication pertaining to the start of the motor, the motor being configured to move the movable barrier, the controller being further configured to, upon receiving the indication, form and responsively transmit a first signal at the output of the interface, the signal being operable to reduce the power supplied to the audio amplifier device.

13. The control apparatus of claim 12 wherein the information pertaining to the start of the motor is selected from the group consisting of information relating to the actual start of the motor and information relating to the impending start of the motor.

14. The control apparatus of claim 12 wherein the controller receives a second signal via the input of the interface, the second signal indicating the halting of the operation of the motor, the controller being further configured to responsively form and transmit a third signal at the output of the interface, the third signal operable to cause a re-application of the power to the audio amplifier device.

15. The control apparatus of claim 12 wherein the first signal is operable to reduce the power supplied to the audio amplifier device to a substantially zero amount.

16. The control apparatus of claim 12 wherein the signal is operable to reduce the power supplied to the audio amplifier device to a non-zero amount.

17. A movable barrier operator system comprising:
a transformer that is configured to receive power from a power source;
a power switching apparatus coupled to the transformer;
an audio amplifier device coupled to the power switching apparatus and configured to receive power from the transformer via the power switching apparatus, the audio amplifier device being further configured to present audio signals having a corresponding content to a user;
a motor coupled to the power switching apparatus, the motor being coupled to and configured to move a movable barrier;
a control apparatus coupled to the motor and the power switching apparatus, the control apparatus configured to receive an indication pertaining to the start of the motor, the control apparatus being further configured to, upon receiving the indication, form and responsively transmit a first signal to the power switching apparatus, the first signal being operable to cause the power switching apparatus to reduce the power being supplied to the audio amplifier device.

18. The system of claim 17 wherein the information pertaining to the start of the motor is selected from the group consisting of information relating to the actual start of the motor and information relating to the impending start of the motor.

19. The system of claim 17 wherein the control apparatus receives a second signal from the motor, the second signal indicating the halting of the operation of the motor, the control apparatus being further configured to responsively form and send a third signal to the power switching apparatus, the third signal operable to cause the power switching apparatus to re-apply the power received from the transformer to the audio amplifier device.

20. The system of claim 17 wherein the control apparatus is configured to after expiration of a predetermined time period, transmit a third signal to the power switching apparatus, the third signal operable to cause the power switching apparatus to re-apply the power received from the transformer to the audio amplifier device.

21. The system of claim 17 wherein the first signal is operable to reduce the power supplied to the audio amplifier device to a substantially zero amount.

22. The system of claim 17 wherein the first signal is operable to reduce the power supplied to the amplifier device to a non-zero amount.

23. The system of claim 17 wherein the content is selected from the group consisting of musical content, human voice content, a doorbell chime, a sound annunciation, a radio broadcast, and a television broadcast.

24. The system of claim 17 wherein the movable barrier is selected from the group consisting of a garage door, a sliding door, a swinging door, a swinging gate, a sliding gate, and shutters.

25. A movable barrier operator system comprising:
a transformer that is configured to receive power from a power source;
a power switching apparatus coupled to the transformer;
a motor coupled to the power switching apparatus, the motor being coupled to and configured to move a movable barrier;
an audio amplifier device coupled to the power switching apparatus and configured to receive power from the transformer via the power switching apparatus, the audio amplifier device being further configured to present audio signals having a corresponding content to a user;
wherein the power switching apparatus is configured to receive an indication pertaining to the start of the motor and upon receiving the indication to reduce the power being supplied to the audio amplifier device.

26. The system of claim 25 wherein the information pertaining to the start of the motor is selected from the group consisting of information relating to the actual start of the motor and information relating to the impending start of the motor.

27. The system of claim 25 wherein the first signal is operable to reduce the power supplied to the audio amplifier device to a substantially zero amount.

28. The system of claim 25 wherein the first signal is operable to reduce the power supplied to the amplifier device to a non-zero amount.

29. The system of claim 25 wherein the content is selected from the group consisting of musical content, human voice content, a doorbell chime, a sound annunciation, a radio broadcast, and a television broadcast.

30. The system of claim 25 wherein the movable barrier is selected from the group consisting of a garage door, a sliding door, a swinging door, a swinging gate, a sliding gate, and shutters.

31. A movable barrier operator system comprising:
a transformer that is configured to receive power from a power source;
a motor coupled to the transformer, the motor being coupled to and configured to move a movable barrier;
an audio amplifier device coupled to the transformer and configured to receive power from the transformer, the audio amplifier device being further configured to present audio signals having a corresponding content to a user;
wherein the audio amplifier device is configured to receive an indication pertaining to the start of the motor and, upon receiving the indication, to deactivate.

32. The system of claim 31 wherein the information pertaining to the start of the motor is selected from the group consisting of information relating to the actual start of the motor and information relating to the impending start of the motor.

33. The system of claim 31 wherein the first signal is operable to reduce the power supplied to the audio amplifier device to a substantially zero amount.

34. The system of claim 31 wherein the first signal is operable to reduce the power supplied to the amplifier device to a non-zero amount.

35. The system of claim 31 wherein the content is selected from the group consisting of musical content, human voice content, a doorbell chime, a sound annunciation, a radio broadcast, and a television broadcast.

36. The system of claim 31 wherein the movable barrier is selected from the group consisting of a garage door, a sliding door, a swinging door, a swinging gate, a sliding gate, and shutters.

* * * * *